US005507953A

United States Patent [19]
Machlitt et al.

[11] Patent Number: 5,507,953
[45] Date of Patent: Apr. 16, 1996

[54] EXTRACTION METHOD AND APPARATUS FOR CLEANING CONTAMINATED SOIL

[75] Inventors: Rainer Machlitt; Frank Meyer, both of Wuppertal, Germany

[73] Assignees: Peter Flakus, Langenfeld; Horst Muehr, Duesseldorf; Erwin Wessling, Altenberge, all of Germany

[21] Appl. No.: 147,983

[22] Filed: Nov. 5, 1993

[51] Int. Cl.⁶ .............................. B01D 11/02; B08B 7/04
[52] U.S. Cl. .......................... 210/634; 134/10; 134/25.1; 134/30; 134/40; 202/152; 203/43; 210/182; 210/188; 210/259; 210/770; 210/780; 210/806
[58] Field of Search .................................... 210/182, 634, 210/639, 768, 771, 772, 774, 780, 783, 784, 806, 909; 203/43; 96/181, 182; 208/262.1, 262.5; 134/10, 25.1, 26, 29, 30, 32, 40; 241/24, 68

[56] References Cited

U.S. PATENT DOCUMENTS

| 4,098,648 | 4/1978 | Kraemer et al. | 196/14.52 |
|---|---|---|---|
| 4,606,774 | 8/1986 | Morris | 134/10 |
| 4,783,263 | 11/1988 | Trost et al. | 210/638 |
| 4,906,302 | 3/1990 | Bruya | 210/909 |
| 4,975,198 | 12/1990 | Steiner | 210/634 |
| 5,055,196 | 10/1991 | Darian et al. | 210/909 |
| 5,056,541 | 10/1991 | Schade et al. | 134/25.1 |
| 5,078,868 | 1/1992 | Robertson | 210/909 |
| 5,302,211 | 4/1994 | Bunger et al. | 134/32 |
| 5,340,406 | 8/1994 | Fearon | 210/634 |

FOREIGN PATENT DOCUMENTS

| 3726282 | 2/1989 | Germany . |
|---|---|---|
| 4019110 | 12/1991 | Germany . |
| 4103473 | 3/1992 | Germany . |

OTHER PUBLICATIONS

"Extraktion von Feststoffen", *Ullmann's Encyclopedia of Chemical Technology*, vol. 2, pp. 722–729., Undated.

"Extraction as a Method for Cleaning Contaminated Soil: Possibilities, Problems and Research", 1984, Rulkens, et al, pp. 576–583.

*Primary Examiner*—Joseph W. Drodge
*Attorney, Agent, or Firm*—Michael J. Striker

[57] ABSTRACT

The method of cleaning soil contaminated with contaminants includes comminuting contaminated soil to form a comminuted contaminated soil; filling the comminuted contaminated soil into a countercurrent extractor from above under an inert gas atmosphere so that the comminuted contaminated soil moves as a travelling bed downward through the countercurrent extractor; feeding a solvent, advantageously acetone, into a lower portion of the countercurrent extractor so that the solvent flows upward through the travelling bed to form a decontaminated soil at the bottom of the extractor and a contaminant-charged solvent portion taken from a middle portion; supplying a conveying liquid to the lower portion of the countercurrent extractor so as to transfer the decontaminated soil from the countercurrent extractor to a filter device having a belt filter; and separating the decontaminated soil in the filter device into a cleaned soil and a reusable conveying liquid. A feeder device is provided for the filter device which avoids clogging of the moving belt filter by the soil when the soil has a high proportion of silt.

29 Claims, 2 Drawing Sheets

EXTRACTION METHOD AND APPARATUS FOR CLEANING CONTAMINATED SOIL

BACKGROUND OF THE INVENTION

The present invention relates to an extraction method and extraction apparatus for cleaning soil, particularly soil which is contaminated with hydrocarbons and/or hetero-organic compounds.

In extraction methods of this type contaminated soil is treated with a solvent in an extractor, the solvent laden with the contaminating materials or pollutants is removed from the soil and separated into a contaminant containing extract and a reusable solvent.

A known process of this type is described on pages 576 and 577 (FIG. 1) in the article "Extraction as a Method for Cleaning Contaminated Soil: Possibilities, Problems and Research" in *Management of Uncontrolled Hazardous Waste Sites,* published by Hazardous Materials Control Research Institute, Silver Spring, Md., USA, 1984. No concrete solutions to the problem of cleaning contaminated soil are provided in this reference, although general and theoretical considerations are discussed.

An extraction method for solids is disclosed in "Ullmanns Encyclopedia of Chemical Technology, Volume 2, pp. 722 to 729, however these methods deal exclusively with extractions of oil seeds, drugs, bones, absorbing clay, catalysts and beet sugar. A belt filter (FIG. 11, p.728) and plane cell-rotating filter (FIG. 10, p. 728) are described in this reference. A method of cleaning contaminated earth or soil is not disclosed in this reference.

A single and multistage countercurrent rotating drum extraction method are described in U.S. Pat. No. 4,098,648 and German Published Patent Application DE-OS 37 26 282, in which the contaminated soil is washed by a solvent, such as hexane and pentane. The method disclosed in these references requires a costly drying of the soil with an expensive apparatus. Moreover this apparatus contains many rotatable operating parts which require not only considerable expenses for seals, but also considerable energy consumption expenses. Generally the problems of effective soil cleaning methods are related to the properties of the soil, particularly to its widely variable grain size and especially with a somewhat high silt component, which leads quickly to stopping or clogging of the sieves, which is connected with increased wear of the mechanical parts contacting with it.

SUMMARY OF THE INVENTION

It is an object of the present invention to provide a method and apparatus of the above-described kind for cleaning contaminated soil, which requires comparatively few mechanical parts and which provides an effective and economical cleaning of contaminated soil in a hydromechanical manner with an efficient comparatively high throughput.

In the method of cleaning contaminated soil according to the invention, after comminution of the soil, the soil is filled into a countercurrent extractor from above under an inert gas counterflow wash, the soil flows downward in this countercurrent extractor as a traveling bed and the solvent is fed into its lower portion and flows through the extractor in a counterflow. The decontaminated soil from the extractor is fed to filter means including a moving filter medium, especially a belt filter, by a feeder means via a conveying liquid drawn into the lower portion of the counterflow extractor. It is separated into a cleaned soil and a reusable recycled conveying liquid in the filter means. In this process only the filter medium operates mechanically, but all other process steps are performed by purely hydromechanical methods. Furthermore the countercurrent extractor comprises a stationary vessel or container. In this countercurrent extractor sufficient dwell time is provided for contact between the contaminated soil and the counterflowing solvent and thus the desired effective cleaning is attained by providing a suitable chemical reaction time. The feed of the soil, of the solvent and of the conveying liquids occurs completely hydromechanically in closed pipes, whereby the method according to the invention for separation of contaminants and/or pollutants from soil requires substantially less energy consumption than conventional methods.

In preferred embodiments of the invention a polar substance such as acetone, methyl ethyl ketone, alcohol or an aqueous surfactant is used as solvent and either similar polar substances or water is used as the transporting or conveying liquid. The water used in the method of the invention can be fresh water. In a particularly preferred embodiment of the invention the conveying liquid can be the same as the solvent. Then during transport of the soil from the countercurrent extractor to the feeder means an additional separation of the contaminated components occurs when the conveying liquid is the same as the solvent. It is also possible alternatively to use water as the conveying liquid.

After the decontaminated soil has passed through the feeder means and reaches the filter means, it is separated from the conveying liquid in several washing devices arranged in series along the filter medium. The separation occurs independently of whether the conveying liquid is water or a polar substance such as the solvent. Advantageously water is used, since water dissolves the polar solvent and may be used to remove it.

To prevent clogging or stopping up of the filter medium, in an advantageous further feature of the invention first the coarse grained soil component and next the fine grained soil component is conveyed to the moving filter medium. Because of these measures, the drainability of the filter cake on the filter medium is maintained and a clogging of the filter by fine silt is avoided.

The solvent containing the contaminant material from the countercurrent extractor is separated into a contaminant extract and into a reusable solvent in a distillation means, preferably a solvent recovery distillation column. The contaminant extract is subsequently separated into a heavier phase containing water and solvent and a lighter phase for high temperature combustion made from contaminant material, fuel oil and residual solvent in a liquid-liquid extraction apparatus, advantageously by addition of fuel oil or an equivalent hydrocarbon fraction to the contaminant extract. The fuel oil and/or the equivalent hydrocarbon fraction maintains the pumpability of the contaminant extract, whose organic phase after cooling otherwise would be a solid, adhesive and not pumpable mass.

The inert gas wash prevents admission of oxygen from the air into the countercurrent extractor and thus guards against the production of combustible gas mixtures.

The exhaust gases are conducted together from the countercurrent extractor, the feeder means and the filter means over a common pipe to an exhaust gas wash column and are cleaned there.

Regarding the apparatus the invention is based on the apparatus shown schematically in FIG. 1 of the first-named prior art reference mentioned hereinabove.

According to the invention, the apparatus for performing the above-described method of cleaning contaminated soil comprises comminution means, a countercurrent extractor accommodating the traveling bed which is connected to receive comminuted soil from the comminution means, and filter means including a closed feeder means and a moving filter medium, to which the closed feeder means is connected. The apparatus also comprises a preparation unit or plant including liquid-liquid extraction means, distillation or solvent recovery column means, and an exhaust gas wash column to which the solvent loaded with contaminant material, the wash liquid from the filter means and the exhaust gases are conducted over connecting pipes. The portion of the contaminated soil not including the silt is ground to a grain size of between 1 mm and 15 mm by the comminution means prior to feed into the countercurrent extractor. In the countercurrent extractor connected to it the comminuted soil in a traveling bed exposed to a solvent, e.g. acetone, in counterflow with a sufficient reaction time. The treated contaminated soil is conveyed hydromechanically to the closed feeder means, from whose end it is fed to the moving filter medium of the filter means and from which it can be removed as a filter cake for refilling.

The preparation or "work up" unit is connected to the above-described soil cleaning unit including the three means or devices connected in series with each other which perform the soil cleaning steps. The preparation unit comprises two connected distillation columns, a liquid-liquid extraction means and an exhaust gas wash column or cleaning means. The solvent loaded with contaminant substances from the countercurrent extractor is pumped together with the contaminant material to be separated from it to a distillation column and from there to a liquid-liquid extraction means, while the spent wash liquid is fed from the filter means to the second of the distillation columns and the exhaust gas is fed to the exhaust gas wash column over a suitable connecting pipe.

To obtain the best possible decontamination of the soil according to another advantageous feature of the invention a homogenizing means, preferably a homogenizing container with a stirring device, can be provided connecting the comminution means and the closed countercurrent extractor with the traveling bed for mixing the soil. In the upper portion of the homogenizing container an inert gas can be fed over a pipe for oxygen exclusion or removal and the soil with a solvent acting as conveying liquid is conveyable from its lower portion through a connecting pipe by a pump into the countercurrent extractor. Because of that, a completely homogeneous consistency of the soil—in this case already with solvent—is guaranteed on admission to the countercurrent extractor.

The filter means or apparatus comprises a belt filter with plane cell-rotating filter or a vacuum cell-rotating filter, or advantageously a vacuum-belt filter according to a preferred embodiment. The feeder means in this filter means is divided into two chambers connected in their upper halves, but otherwise separate from each other. The coarse grained soil component is deposited on the filter medium from the chamber furthest upstream in the feed direction of the moving filter medium and the fine grained soil component is deposited on the filter medium from the chamber next to it. Because of that, a filter cake having a sandwich structure arises, in which the coarse grained component is deposited directly on the filter belt and on top of that a fine grained and silt component so that the drainability of the entire filter cake is maintained. Clogging of the filter belt or medium by the silt component is thus prevented.

According to a particularly advantageous embodiment of the invention the throughput rate of the cleaned soil is determinable by the size of a gap at the outlet for the soil-conveying liquid mixture from the feeder means to the moving filter medium and also by the speed of the moving filter medium. Thus the transport speed of the filter medium is advantageously adjusted so that the height of the filter cake deposited on the filter belt from coarse grained and fine grained soil components remains as constant as possible.

To avoid the production of combustible gas mixture the filter apparatus or means is enclosed in a gas-tight closed housing which has means for supplying its interior with inert gas and providing it with a vacuum or low pressure.

Along the filter medium or belt several washing devices are provided following each other in the feed direction of the filter medium. Each washing device has at least one collecting device, a pipe leading out from the gas-tight closed housing of the filter means, a collection container and a pump. Fresh water is conducted into the washing device furthest removed from the feeder means in the feed direction, while in contrast the closer lying washing devices for washing out of solvent and/or the conveying liquid still contained in the soil mixture are acted on with cleaned recirculated water.

For recovery of the solvent, the water and the conveying liquid the upper portion of the countercurrent extractor is connected by a first connecting pipe with a first distillation column, from which the contaminant concentrate is pumped with the water from the sump of the distillation column by a first pump. The top product comprising cleaned solvent with a small amount of water from this first distillation column is fed again to the countercurrent extractor and the feeder means.

For separation of the wash liquid including solvent, conveying liquid and water the housing of the filter apparatus is connected by a second connecting pipe with a second distillation column having a sump and a top. A purified solvent top product is drawn from the top of the second distillation column and fed back by an additional pump through a first feedback line to the solvent supply pipe for the countercurrent extractor and to the feeder means. A sump product including water is drawn from the sump over a fourth connecting pipe for operation of the exhaust gas wash column.

The upper portions of the countercurrent extractor, the feeder means and the gas-tight housing are connected with an exhaust gas wash column for cleaning of exhaust gas by a third connecting pipe, by which wash water containing contaminants is fed into the liquid-liquid extraction means. Besides this third feed pipe for wash water this liquid-liquid extraction means has two additional feed pipes for fuel oil or an equivalent hydrocarbon fraction and for the contaminant concentrate. From the top of this liquid-liquid extraction means a lighter phase containing the contaminant concentrate, the fuel oil and a small amount of solvent is conducted away for high temperature combustion. The heavier phase comprising water and a little solvent from the sump of the liquid-liquid extraction means is transferred for distillation into the second distillation column. In the preparation unit comprising the distillation columns, the liquid-liquid extraction means and the exhaust gas wash column circulating water and cleaned solvent is recovered and then fed to the soil cleaning arrangement. Because of that, the operating costs can be minimized and the volume of final products fed to the high temperature combustion can be kept small.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
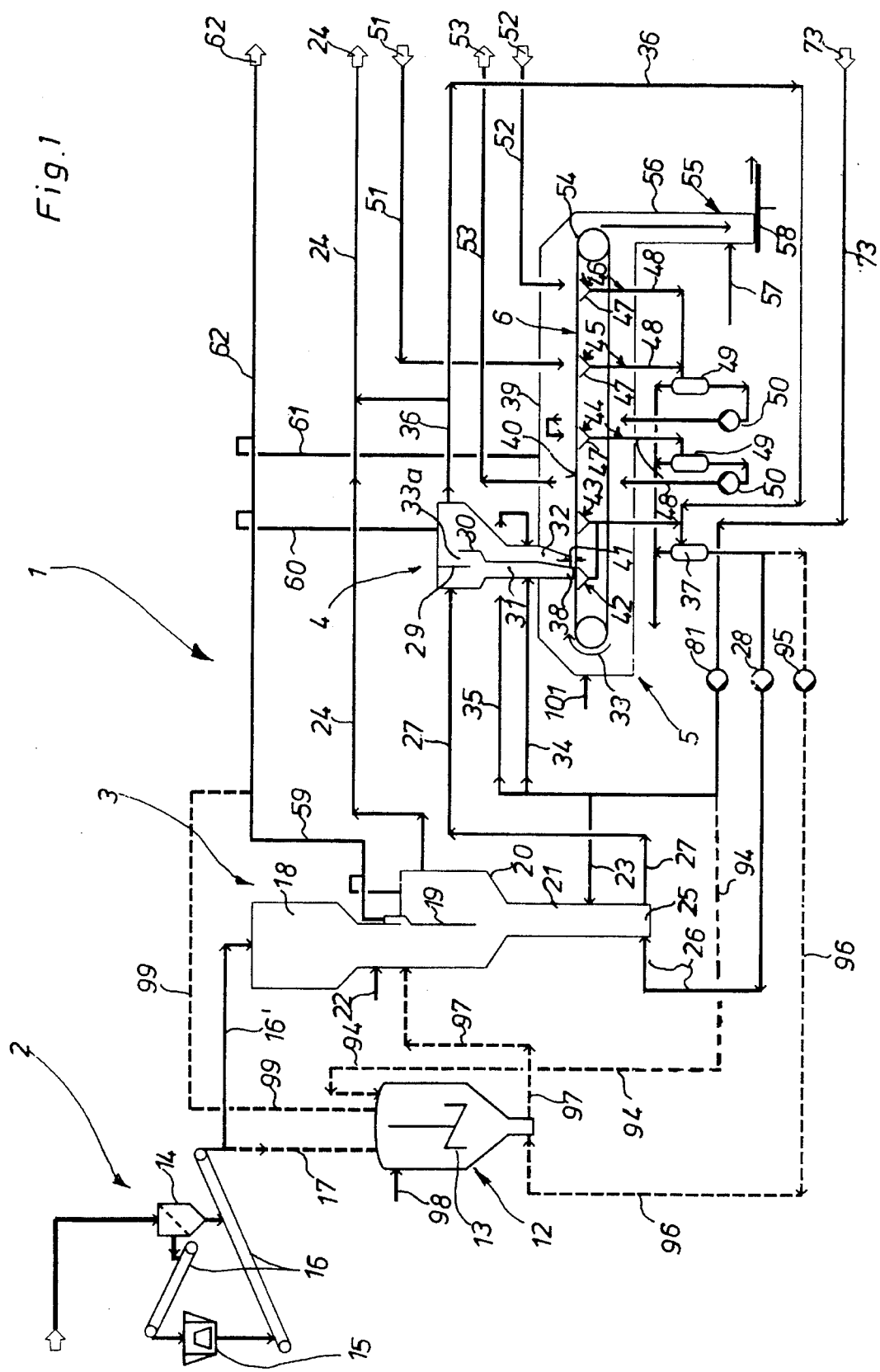
FIG. 1 is a schematic diagram of a soil cleaning unit which is part of a plant for performing the soil cleaning process according to the invention, which includes a comminuting apparatus with an optionally connected homogenizing container, the countercurrent extractor, the filter means with the feeder means and a filter belt with washing devices and connecting pipes and pumps.
Figure 2:
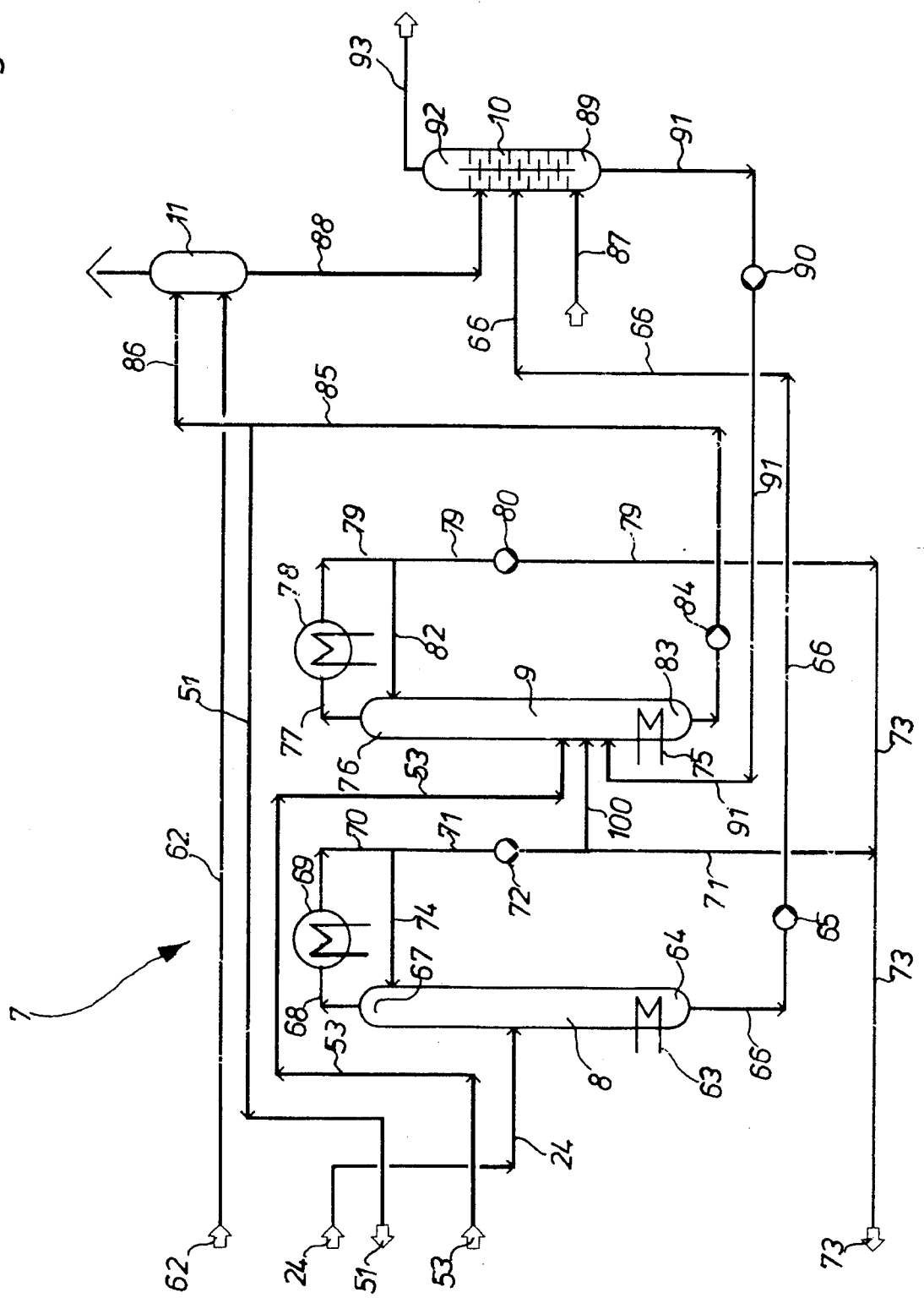
FIG. 2 is a preparation unit which cooperates with the soil cleaning unit of FIG. 1 and includes an exhaust gas wash column, distillation means and a liquid-liquid extraction apparatus for recovery of purified solvent and circulated water.

The soil cleaning unit shown in FIG. 1 is connected with the preparation unit shown in FIG. 2 in a preferred embodiment of the apparatus to perform the method of cleaning contaminated soil according to the invention. The right hand side of FIG. 1 is connected with the left hand side of FIG. 2 and the flows at these numbered connection points are shown by arrows.

The apparatus 1 according to the invention comprises a soil cleaning unit (FIG. 1) including a comminuting device 2, the countercurrent extractor 3 with traveling bed, the closed feeder device 4, the filter device 5 with the moving filter medium 6 and a preparation unit 7 (FIG. 2) which comprises a first distillation column 8, a second distillation column 9, a liquid-liquid extraction device 10 and an exhaust gas wash column 11. A rotating disk extractor can be used as the liquid-liquid extraction device. However a mixer-settler device, a pulsating column or a perforated plate column could also be used.

For the case in which the contaminated soil has a very wide, variable grain size spectrum with a high degree of fines, it is advantageous to arrange a homogenizing container 12 with stirring device 13 between the comminuting device 2 and the countercurrent extractor 3 with the traveling bed for thorough mixing of the soil. When the homogenizing means including the homogenizing container 12 with the stirring device 13 is used the countercurrent extractor 3 is closed on its top side, but is otherwise open there for direct filling with soil.

The comminuting device or means 2 is assembled from known devices and comprises a sieve device 14, a crushing device 15 for oversized grains and a feed mechanism 16, which feeds the contaminated soil from the sieve device 14 to the crushing device 15 and from there either directly to the countercurrent extractor 3 or—in case a homogenization is required—into the homogenizing container 12. In each case the soil fed into the pipe 16' or into the pipe 17 is processed mechanically.

The countercurrent extractor 3 consists essentially of an entrance portion 18, a middle portion 20 partially divided by a separating wall 19 and a countercurrent portion 21. An inert gas, e.g. nitrogen, is fed by the pipe 22 into the entrance portion 18 and expels the air oxygen in the deposited layer of the entrance portion 18, so that a combustible gas mixture does not build up in the downstream portions of the extractor 3.

A solvent, which comprises acetone, is fed over the pipe 23 into the countercurrent portion 21. This solvent flows upward in the countercurrent portion 21 and into the travelling bed comprising the contaminated soil flowing downward. The contaminant material in the soil and the moisture present in it thus are received in the solvent. This solvent containing the contaminated components is drawn over a first connecting pipe 24 into an upper portion of the first distillation column 8 (FIG. 2).

A conveying liquid is guided over the pipe 26 to the lower end 25 of the countercurrent extractor 3, which can be the same as the solvent (here acetone) or water and/or acetone and water or an equivalent liquid. This transporting liquid receives the soil contained in the extractor 3 and transports it over the pipe 27 to the feeder device 4. This feed occurs by action of the pump 28. The soil pouring into the entrance portion 18 and the middle portion 20 in the form of a traveling bed moving opposite to the solvent, e.g. acetone, supplied over the pipe 23 is suitable for a continuous production of decontaminated soil at the end 25 of the countercurrent extractor 3 over pipe 27 to the preparation unit 4. Because of these counterflows outstanding conditions are provided for the desired extraction of contaminants from the soil. As much soil is fed into the entrance portion 18 of the conveying liquid in the same time interval as is conveyed out of the extractor 3 by the feeder device 4 over the pipe 27. Because of that, the soil in the countercurrent extractor 3 remains at an approximately constant level.

The feeder device 4 is divided by two separating walls 29, 30 into two chambers 31,32, which are connected to each other in their upper halves by a throughgoing opening 33a, in contrast to the lower halves which are separated from each other. It is understood that in the feeder device several chambers 31,32 are arranged next to each other. In this feeder device 4 the soil-transport liquid mixture separates by sedimentation into solids and liquids. The solid component of the soil settles and forms a deposited layer. The coarse grain soil component deposits in the chamber 31 which is furthest upstream in the feed direction (arrow 33) of the moving filter medium 6 and the fine grain soil component deposits in the chamber 32 next to chamber 31. The solvent can be fed once again into the solids deposited in the chambers 31,32 over pipes 34,35. Excess liquid leaves the feeder device 4 over the pipe 36 and is collected with other liquid flows in a collecting container 37.

The lower open end 38 of the feeder device 4 protrudes into the gas-tight closed housing 39 of the filter device 5 and is positioned at the upper surface 40 of the moving filter medium 6. The liquid can be prevented from trickling downward by the special deposited layer formed in the lower portion of the feeder device 4.

The decontaminated soil still containing some liquid is drawn from the feeder device 4 by motion of the filter medium 6, comprising in the present instance a filter belt. The drawn volume of the solid liquid mixture per unit time and thus the throughput speed are determined by the gap 41 between the lower end 38 of the feeder device 4 and the upper surface 40 of the moving filter medium 6 and the belt speed in the direction of the arrow 33 of the moving filter medium 6. The throughput speed is adjusted so that the height of the solid layer in the feeder device 4 remains approximately constant.

First the coarse grain size soil from the chamber 31 is deposited on the surface 40 of the moving filter medium 6 and then on this bottom layer the fine grained soil from the following chamber 32 can be deposited during drawing of the decontaminated soil from the lower part of the feeder device 4. The filterability and thus the drainage of the filter cake deposited on the upper surface 40 of the moving filter medium is thus improved and the clogging of the filter medium 6, for example by a fine silt component, is thus prevented.

A known belt filter is used as the filter medium 6 in the present case illustrated in the drawing. It is understood however that plane cells rotating filter or the known vacuum cells rotating filter can also be used to perform the filtration at this stage of the process. Since in the present case the filter stages 42,43 and the collecting device 47 in the filter means 5 are under vacuum the filter means 5 can be a vacuum belt filter.

Several washing devices 44,45,46 and filter stages 42,43 can be arranged along the moving filter medium 6 in the feed direction shown by the arrow 33.

Each washing device 44,45 comprises in a known way a collecting device 47 in the housing 39, a collecting container 49 outside of the housing 39 and a connecting pipe 48 connecting them as well as a pump 50. The solid soil material is acted on in the filter device 5 with a counterflow wash with circulated water fed over the pipe 51 and as needed with fresh water fed over the pipe 52. For this multistage wash process the filter device 5 is equipped with the previously described washing devices 44, 45 and 46, of which a plurality are shown in FIG. 1. The collecting containers 49 of these washing devices are connected to a common not shown vacuum apparatus. Also the collecting container 37 can be connected to this unshown vacuum apparatus.

The water for the countercurrent washes fed over the pipes 51,52 receives in each washing device acetone. The washing liquid comprising solvent conveying liquid and water is pumped over a second connecting pipe 53 into a second distillation column 9 for additional processing to be described hereinbelow.

The contaminated soil solids washed in this way is stripped from the moving filter medium 6 at its end 54 and drops into the discharge device 55. This discharge device 55 comprises a shaft 56, an inert gas-feed pipe 57 and a plate dispensing device 58. A belt dispensing device however can also be used. The inert gas prevents the admission of air oxygen into the gas-tight closed housing 39 of the filter device 5, which guards against the formation of a combustible gas mixture.

The exhaust gases produced in the plant 1 shown in FIG. 1 and originating from the countercurrent extractor 3, the feeder means 4 and the housing 39 of the filter means 5 are fed over the pipes 59, 60, 61 into a third connecting pipe 62 and are conducted over pipe 62 to the exhaust gas wash column 11 for further processing.

According to FIG. 2 the contaminated material dissolved in the solvent is fed over the pipe 24 into the first distillation column 8. In this distillation column 8 solvent contained in the mixture is evaporated by the heater 63 and the contaminated material concentrate collected in the sump 64 is conducted over the pump 65 and the pipe 66 into the liquid-liquid extraction means 10. The solvent-water vapor collected in the head 67 of the first distillation column 8 is fed over the pipe 68 to a condenser 69, in which it condenses and the condensate is pumped over the pipe 70 and over the pipe 71 by the pump 72 into a first feedback pipe 73. A portion of the condensate is fed back again into the head 67 of the first distillation column 8 over the connecting pipe 74.

The washing liquid comprising the solvent, conveying liquid and water arrives in the second distillation column via the pipe 53. This is heated by the heating means 75. The vapor phase of solvent, here acetone, formed in the head 76 of the second distillation column is fed over a pipe 77 to an additional condenser 78, in which it condenses and is fed in a similar way into the second return pipe 73 via connecting pipe 79. A portion of the condensate is fed back into the head 76 of the second distillation column 9 as a reflux by the connecting pipe 82 branching from the connecting pipe 79. According to FIG. 1 an additional pump 81 is provided in the second return or feedback pipe 73, which feeds the obtained solvent, acetone, over the pipe 23 into the countercurrent extractor 3 and also over the pipes 34,35 into the feeder means 4.

A heavy water phase collected in the sump 83 of the second distillation column 9 is pumped over the serially connected connecting pipes 85 and 86 into the exhaust gas wash column 11 and to the washing devices 44,45,46 via the return pipe 51 branching from the connecting pipe 85 by pump 84 in line 85.

The liquid-liquid extraction means 10 is provided with two additional supply lines in addition to the connecting line 66 for supply of the product comprising contaminant material and water from the sump 64 of the first distillation column 8. Fuel oil or an equivalent hydrocarbon fraction is conducted over the connecting line 87 to maintain the pumpability of the collected mixture which is viscous under certain conditions. A mixture containing solvent, conveying liquid and water is fed into the extraction means 10 via a second connecting line 88.

The heavier phase comprising water with a reduced acetone component collected in the sump 89 of the liquid-liquid extraction device 10 includes a heavier phase and is fed by the pump 90 and the pipe 91 to further processing in the second distillation column 9. The lighter phase comprising the contaminants, the fuel oil fraction and a reduced portion of acetone collects in the head 92 of the liquid-liquid extraction device 10 and is fed over the pipe 93 for final disposal to a high temperature combustion device.

When the special nature of the contaminated soil to be cleaned requires a homogenization because of its wide variable grain size spectrum and its high fine grain component, the soil comminuted in the comminution means 2 is fed over the connecting pipe 17 shown with dashed lines in FIG. 1 to the homogenizing container 12 provided with the stirring device 13. In this embodiment the pipe 16' is eliminated, although it is shown in FIG. 1 and used in the previously described embodiment. Instead of pipe 16' solvent is pumped into the homogenizing container 12 from the pipe 73 over the connecting pipe 94 shown with dashed lines by the pump 81. The conveying liquid is fed in the lower part of the homogenizing container 12 from the collecting container 37 over the connecting line 96 shown with dashed lines by the pump 95 in it, where it receives the solids-acetone mixture of the homogenizing container 12 and is then fed over the pipe 97 into the middle stage 20 of the countercurrent extractor 3 whose upper portion 18 is closed. Further an inert gas is fed over the pipe 98 into the upper portion of the homogenizing container 12 to drive out oxygen in the solids and thus to guard against the formation of combustible mixtures. The exhaust gas arrives over the feed line 99 shown with dashed lines at the head of the homogenizing container 12 in the third connecting pipe 62 and from there is fed for further processing in the exhaust gas wash column 11 as seen in FIG. 2.

In the method according to the invention water as mentioned in the claims hereinbelow can be obtained largely from the contaminated soil.

While the invention has been illustrated and described as embodied in an extraction method and apparatus for cleaning contaminated soil, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Method of cleaning soil contaminated with contaminants selected from the group consisting of hydrocarbons and hetero-organic compounds, said method comprising the steps of:
   a) comminuting soil contaminated with contaminants selected from the group consisting of hydrocarbons and hetero-organic compounds in comminuting means to form a comminuted contaminated soil;
   b) filling the comminuted contaminated soil into a countercurrent extractor so that said comminuted contaminated soil moves as a travelling bed in a downward direction through said countercurrent extractor;
   c) feeding a solvent into a lower portion of said countercurrent extractor so that said solvent flows in a direction opposite to said downward direction to form a decontaminated soil and a contaminant-charged solvent portion;
   d) supplying separately from said solvent a conveying liquid, which is different from said solvent, to said lower portion of said countercurrent extractor so as to convey said decontaminated soil from said countercurrent extractor to a filter means with a moving filter medium;
   e) separating said decontaminated soil in said filter means into a cleaned soil and a reusable conveying liquid; and
   f) feeding exhaust gases formed during said feeding and formed in said countercurrent extractor and said filter means to an exhaust gas washing means for cleaning said exhaust gases and washing said exhaust gases in said exhaust gas washing means.

2. Apparatus for cleaning contaminated soil, comprising comminuting means for comminuting contaminant containing soil to form a comminuted contaminated soil; a countercurrent extractor connected to said comminuting means so as to receive said comminuted contaminated soil and to receive a solvent to form a decontaminated soil and a contaminant-containing solvent portion; filter means including a moving filter medium and having feeder means for dispensing said decontaminated soil to said moving filter medium, said feeder means being connected to said countercurrent extractor to receive said decontaminated soil, and means for washing said dispensed decontaminated soil to form a wash liquid; means for supplying a conveying liquid to said countercurrent extractor so as to convey the decontaminated soil with said conveying liquid to said filter means; a first distillation means connected to the countercurrent extractor so as to receive the contaminant-containing solvent portion; a second distillation means; and an exhaust gas wash column; and wherein said second distillation means is connected to said filter means to receive said wash liquid from said filter means and said exhaust gas wash column is connected to said countercurrent extractor and to said filter means so as to receive exhaust gases generated in said countercurrent extractor and said filter means.

3. Apparatus as defined in claim 2, further comprising a homogenizing container with stirring means, said homogenizing container being connected between said comminuting means and said countercurrent extractor, said countercurrent extractor being provided with means for closing an upper portion of said extractor to prevent top loading of said extractor and with means for forming a travelling bed of said contaminated soil in said extractor; means for feeding an inert gas into an upper portion of said homogenizing container to expel oxygen from said homogenizing container and means for feeding a solvent acting as a conveying liquid into a lower portion of said homogenizing container for conveying a homogenized portion of said contaminated soil into said countercurrent extractor, said lower portion of said homogenizing container being connected to said countercurrent extractor by pump means for supplying said homogenized portion.

4. Apparatus as defined in claim 2, wherein said filter means is selected from the group consisting of belt filters, plane cell rotating filters and vacuum cell rotating filters.

5. Apparatus as defined in claim 2, wherein said feeder means has two interior separating walls dividing said feeder means into two chambers arranged next to each other in a feed direction of said filter medium so that a coarse grained soil component deposits on the filter medium from the chamber furthest upstream in said feed direction and the fine grained soil component deposits on the filter medium from the chamber next to chamber from which said coarse grained soil component deposits.

6. Apparatus as defined in claim 2, wherein said feeder means of said filter means and said countercurrent extractor are arranged such that a throughput speed of said contaminated soil is determined by a size of a gap between said feeder means and said moving filter medium and a speed of said moving filter medium.

7. Apparatus as defined in claim 6, wherein said moving filter medium comprises a belt filter and said feeder means has a free end positioned next to an upper side of said belt filter, said means for washing of said filter means comprises a plurality of washing devices arranged along said belt filter next to each other and said filter means further comprises a gas-tight housing accommodating said belt filter, means for supplying an inert gas connected to said gas-tight housing and means for producing a low pressure in said gas-tight housing.

8. Apparatus as defined in claim 7, wherein each of said washing devices comprises at least one collecting device arranged in the vicinity of said belt filter in said gas-tight housing, a collection container outside of said gas-tight housing and a pipe including a pump device, said pipe connecting said collecting device with said collection container.

9. Apparatus as defined in claim 8, wherein said first distillation means comprises a first distillation column having a sump and a top and said first distillation column is connected to an upper portion of said countercurrent extractor to receive said contaminant-containing solvent portion to produce a contaminant concentrate at said sump and a top product including said solvent at said top, and said sump of said first distillation column is connected to a liquid-liquid extraction means by a first pump so that said contaminant concentrate can be pumped to said liquid-liquid extraction means by said first pump.

10. Apparatus as defined in claim 9, wherein said second distillation means comprises a second distillation column having a sump and a top and wherein said means for washing of said filter means is connected with said second distillation column to receive said wash liquid from said washing devices and to separate said wash liquid into a top product including said solvent and a sump product including water, and further comprising means for connecting said sump of said second distillation column with said exhaust gas wash column to supply said water to said exhaust gas wash column and said top of said second distillation column is provided with means for returning a portion of solvent to said countercurrent extractor and said feeder means.

11. Apparatus as defined in claim 10, wherein said upper portion of said countercurrent extractor, said feeder means and said gas-tight housing of said filter means are connected with said exhaust gas wash column for conducting said exhaust gases to said exhaust gas wash column.

12. Apparatus as defined in claim 10, further comprising means for feeding a part of said top product of said first distillation column into said second distillation column.

13. Apparatus as defined in claim 10, further comprising additional respective means for supplying water, and for supplying a hydrocarbon fraction to said liquid-liquid extraction means, said hydrocarbon fraction being selected from the group consisting of heating oil and equivalent hydrocarbon fractions.

14. Apparatus as defined in claim 13, further comprising means for pumping a heavy phase formed in said liquid-liquid extraction means into said second distillation column, said heavy phase including said water and said solvent.

15. Apparatus as defined in claim 14, further comprising means for feeding said water collected in said sump of said second distillation column into said exhaust gas wash column and to said washing devices of said filter means.

16. Apparatus as defined in claim 15, further comprising means for feeding a portion of said top product of said first distillation column and another portion of said top product of said second distillation column together to said countercurrent extractor and said feeder means of said filter means.

17. Apparatus for cleaning soil contaminated with contaminants selected from the group consisting of hydrocarbons and hetero-organic compounds, said apparatus comprising:
  a) means for comminuting soil contaminated with contaminants selected from the group consisting of hydrocarbons and hetero-organic compounds in comminuting means to form a comminuted contaminated soil;
  b) means for filling the comminuted contaminated soil into a countercurrent extractor under an inert gas atmosphere so that said comminuted contaminated soil moves as a travelling bed in a downward direction through said countercurrent extractor;
  c) means for feeding a solvent into a lower portion of said countercurrent extractor so that said solvent flows through said travelling bed in a direction opposite to said downward direction to form a decontaminated soil and a contaminant-charged solvent portion;
  d) means for supplying a conveying liquid to said lower portion of said countercurrent extractor so as to convey said decontaminated soil from said countercurrent extractor via a feeder means to a filter means with a moving filter medium;
  e) means for separating said decontaminated soil in said filter means into a cleaned soil and a reusable conveying liquid;
  means for washing exhaust gases formed in said feeder means, said countercurrent extractor and said filter means and means for feeding said exhaust gases to said means for washing said exhaust gases.

18. Method of cleaning contaminated soil, comprising the steps of:
  a) comminuting contaminant-containing soil to form a comminuted contaminated soil;
  b) extracting said comminuted contaminated soil with a solvent in a countercurrent extractor to which said comminuted contaminated soil and said solvent are fed to form a decontaminated soil and a contaminant-charged solvent portion;
  c) feeding said decontaminated soil to a filter means including a moving filter medium;
  d) filtering said decontaminated soil on said filter means with said moving filter medium;
  e) separating said contaminant-charged solvent portion from said countercurrent extractor in a distillation column into a contaminant extract and a reusable solvent portion;
  f) separating a mixture of a separately added hydrocarbon fraction and said contaminant extract in a liquid-liquid extraction device into a lighter phase containing contaminants, said hydrocarbon fraction and a residual amount of said solvent, and a heavier phase containing water and another portion of said solvent; and
  g) feeding exhaust gases formed in said comminuting step a), said extracting step b) and said feeding step c) into an exhaust gas wash device and washing said exhaust gases in said exhaust gas wash device.

19. Method as defined in claim 18, further comprising the steps of homogenizing said comminuted contaminated soil in a homogenizing container prior to said extracting; feeding an inert gas into an upper portion of said homogenizing container to expel oxygen from said homogenizing container and feeding a solvent acting as a conveying liquid into a lower portion of said homogenizing container for conveying a homogenized portion of said comminuted contaminated soil into said countercurrent extractor, said lower portion of said homogenizing container being connected to said countercurrent extractor by pump means for supplying said homogenized portion.

20. Method as defined in claim 18, further comprising providing a feeder device for feeding said decontaminated soil to said moving filter medium, wherein said feeder device has two interior separating walls dividing said feeder device into two chambers arranged next to each other in a feed direction of said moving filter medium, and feeding said decontaminated soil to said moving filter medium with said feeder device so that a coarse grained soil component deposits on the filter medium from the chamber of the feeder device furthest upstream in said feed direction of said moving filter medium and a fine grained soil component deposits on the filter medium from the chamber next to the chamber from which said coarse grained soil component deposits.

21. Method as defined in claim 18, further comprising dividing said decontamined soil into a coarse grained soil portion and a fine grained soil portion and first feeding said coarse grained soil portion to said moving filter medium and then feeding said fine grained soil portion so that said to said moving filter medium fine grained soil portion is deposited on said coarse grained soil portion on said filter medium.

22. Method of cleaning soil contaminated with contaminants selected from the group consisting of hydrocarbons and hetero-organic compounds, said method comprising the steps of:
  a) comminuting soil contaminated with contaminants selected from the group consisting of hydrocarbons and hetero-organic compounds in comminuting means to form a comminuted contaminated soil;

b) filling the comminuted contaminated soil into a countercurrent extractor under an inert gas atmosphere so that said comminuted contaminated soil moves as a travelling bed in a downward direction through said countercurrent extractor;

c) feeding a solvent into a lower portion of said countercurrent extractor so that said solvent flows through said travelling bed in a direction opposite to said downward direction to form a decontaminated soil and a contaminant-charged solvent portion;

d) supplying a conveying liquid to said lower portion of said countercurrent extractor so as to convey said decontaminated soil from said countercurrent extractor to a filter means with a moving filter medium; and e) separating said decontaminated soil in said filter means into a cleaned soil and a reusable conveying liquid, said separating of said cleaned soil from said conveying liquid occurring in several washing devices arranged in succession along said moving filter medium.

23. Method of cleaning soil contaminated with contaminants selected from the group consisting of hydrocarbons and hetero-organic compounds, said method comprising the steps of:

a) comminuting soil contaminated with contaminants selected from the group consisting of hydrocarbons and hetero-organic compounds in comminuting means to form a comminuted contaminated soil;

b) filling the comminuted contaminated soil into a countercurrent extractor under an inert gas atmosphere so that said comminuted contaminated soil moves as a travelling bed in a downward direction through said countercurrent extractor;

c) feeding a solvent into a lower portion of said countercurrent extractor so that said solvent flows through said travelling bed in a direction opposite to said downward direction to form a decontaminated soil and a contaminant-charged solvent portion;

d) supplying a conveying liquid to said lower portion of said countercurrent extractor so as to convey said decontaminated soil from said countercurrent extractor to a filter means with a moving filter medium;

e) separating said decontaminated soil in said filter means into a cleaned soil and a reusable conveying liquid, f) dividing said decontaminated soil into a coarse grained soil portion and a fine grained soil portion; and g) first feeding said coarse grained soil portion to said moving filter medium and then feeding said fine grained soil portion to said moving filter medium so that said fine grained soil portion is deposited on said coarse grained soil portion on said filter medium.

24. Method of cleaning soil contaminated with contaminants selected from the group consisting of hydrocarbons and hetero-organic compounds, said method comprising the steps of:

a) comminuting soil contaminated with contaminants selected from the group consisting of hydrocarbons and hetero-organic compounds in comminuting means to form a comminuted contaminated soil;

b) filling the comminuted contaminated soil into a countercurrent extractor under an inert gas atmosphere so that said comminuted contaminated soil moves as a travelling bed in a downward direction through said countercurrent extractor;

c) feeding a solvent into a lower portion of said countercurrent extractor so that said solvent flows through said travelling bed in a direction opposite to said downward direction to form a decontaminated soil and a contaminant-charged solvent portion;

d) supplying a conveying liquid to said lower portion of said countercurrent extractor so as to convey said decontaminated soil from said countercurrent extractor to a filter means with a moving filter medium;

e) separating said decontaminated soil in said filter means into a cleaned soil and a reusable conveying liquid, f) separating said contaminant-charged solvent portion from said countercurrent extractor in a distillation column into a contaminant extract and a reusable solvent portion; and g) separating a mixture of a separately added hydrocarbon fraction and said contaminant extract in a liquid-liquid extraction device into a lighter phase containing contaminants, said hydrocarbon fraction and a residual amount of said solvent, and a heavier phase containing water and another portion of said solvent.

25. Apparatus for cleaning soil contaminated with contaminants selected from the group consisting of hydrocarbons and hetero-organic compounds, said method comprising the steps of:

a) means for comminuting soil contaminated with contaminants selected from the group consisting of hydrocarbons and hetero-organic compounds in comminuting means to form a comminuted contaminated soil;

b) means for filling the comminuted contaminated soil into a countercurrent extractor under an inert gas atmosphere so that said comminuted contaminated soil moves as a travelling bed in a downward direction through said countercurrent extractor;

c) means for feeding a solvent into a lower portion of said countercurrent extractor so that said solvent flows through said travelling bed in a direction opposite to said downward direction to form a decontaminated soil and a contaminant-charged solvent portion;

d) means for supplying a conveying liquid to said lower portion of said concurrent extractor so as to convey said decontaminated soil from said countercurrent extractor to a filter means with a moving filter medium; and e) means for separating said decontaminated soil in said filter means into a cleaned soil and a reusable conveying liquid, said means for separating of said cleaned soil from said conveying liquid comprising a plurality of washing devices arranged in succession along said moving filter medium.

26. Apparatus for cleaning soil contaminated with contaminants selected from the group consisting of hydrocarbons and hetero-organic compounds, said method comprising the steps of:

a) means for comminuting soil contaminated with contaminants selected from the group consisting of hydrocarbons and hetero-organic compounds in comminuting means to form a comminuted contaminated soil;

b) means for filling the comminuted contaminated soil into a countercurrent extractor under an inert gas atmosphere so that said comminuted contaminated soil moves as a travelling bed in a downward direction through said countercurrent extractor;

c) means for feeding a solvent into a lower portion of said countercurrent extractor so that said solvent flows through said travelling bed in a direction opposite to said downward direction to form a decontaminated soil and a contaminant-charged solvent portion;

d) means for supplying a conveying liquid to said lower portion of said concurrent extractor so as to convey said decontaminated soil from said countercurrent extractor to a filter means with a moving filter medium;

e) means for separating said decontaminated soil in said filter means into a cleaned soil and a reusable conveying liquid;

f) means for dividing said decontaminated soil into a coarse grained soil portion and a fine grained soil portion; and g) means for first feeding said coarse grained soil portion to said moving filter medium and then feeding said fine grained soil portion to said moving filter medium so that said fine grained soil portion is deposited on said coarse grained soil portion on said filter medium.

27. Apparatus as defined in claim 26, wherein said means for comminuting is performed so that a portion of said contaminated soil not including silt is comminuted to a grain size between 1 mm and 15 mm prior to introduction into said countercurrent extractor.

28. Apparatus for cleaning soil contaminated with contaminants selected from the group consisting of hydrocarbons and hetero-organic compounds, said method comprising the steps of:

a) means for comminuting soil contaminated with contaminants selected from the group consisting of hydrocarbons and hetero-organic compounds in comminuting means to form a comminuted contaminated soil;

b) means for filling the comminuted contaminated soil into a countercurrent extractor under an inert gas atmosphere so that said comminuted contaminated soil moves as a travelling bed in a downward direction through said countercurrent extractor;

c) means for feeding a solvent into a lower portion of said countercurrent extractor so that said solvent flows through said travelling bed in a direction opposite to said downward direction to form a decontaminated soil and a contaminant-charged solvent portion;

d) means for supplying a conveying liquid to said lower portion of said countercurrent extractor so as to convey said decontaminated soil from said countercurrent extractor to a filter means with a moving filter medium;

e) means for separating said decontaminated soil in said filter means into a cleaned soil and a reusable conveying liquid;

f) means for separating said contaminant-charged solvent portion from said countercurrent extractor in a distillation column into a contaminant extract and a reusable solvent portion; and g) means for separating a mixture of a separately added hydrocarbon fraction and said contaminant extract in a liquid-liquid extraction device into a lighter phase containing said contaminants, said hydrocarbon fraction and a residual amount of said solvent, and a heavier phase containing water and another portion of said solvent.

29. Apparatus as defined in claim 28, wherein said hydrocarbon fraction consists of fuel oil.

\* \* \* \* \*